(12) United States Patent
Reuther et al.

(10) Patent No.: US 12,504,987 B2
(45) Date of Patent: Dec. 23, 2025

(54) VIRTUAL MACHINE CREATION BASED ON DYNAMIC GROUP HOST NODE FEATURE SET

(71) Applicant: Microsoft Technology Licensing, LLC, Redmond, WA (US)

(72) Inventors: Lars Reuther, Kirkland, WA (US); Pooja Mahadev Soundalgekar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 645 days.

(21) Appl. No.: 17/945,936

(22) Filed: Sep. 15, 2022

(65) Prior Publication Data
US 2024/0095053 A1    Mar. 21, 2024

(51) Int. Cl.
G06F 9/455    (2018.01)
G06F 9/50    (2006.01)

(52) U.S. Cl.
CPC ........ G06F 9/45558 (2013.01); G06F 9/5077 (2013.01); G06F 2009/45562 (2013.01); G06F 2009/4557 (2013.01); G06F 2209/505 (2013.01)

(58) Field of Classification Search
None
See application file for complete search history.

(56) References Cited

U.S. PATENT DOCUMENTS 9,626,206 B2 *  4/2017  Bennett ................. G06F 9/4856
2020/0034190 A1 *  1/2020  Tarasuk-Levin ...... G06F 9/4856

\* cited by examiner

Primary Examiner — Qing Yuan Wu
(74) Attorney, Agent, or Firm — Workman Nydegger

(57) ABSTRACT

Virtual Machine (VM) creation based on a dynamically-calculated feature set. A plurality of feature sets are identified. Each feature set in the plurality of feature sets corresponds to a different VM host node of a plurality of VM host nodes that are part of a common VM migration group, and indicates a set of features available at a corresponding VM host node. From the plurality of feature sets, a group feature set is calculated. The group feature set includes a subset of features that are common among the plurality of feature sets. A VM created within the plurality of VM host nodes is configured to use the group feature set.

20 Claims, 3 Drawing Sheets

200

300

400

VIRTUAL MACHINE CREATION BASED ON DYNAMIC GROUP HOST NODE FEATURE SET

BACKGROUND

Hypervisor-based virtualization technologies allocate portions of a computer system's physical resources (e.g., processor cores and/or time, physical memory regions, storage resources, etc.) into separate partitions, and execute software within each of those partitions. Hypervisor-based virtualization technologies therefore facilitate creation of virtual machine (VM) guests that each executes guest software, such as an operating system (OS) and other software executing therein. A computer system that hosts VMs is commonly called a VM host or a VM host node. While hypervisor-based virtualization technologies can take a variety forms, many use an architecture comprising a hypervisor that has direct access to hardware and that operates in a separate execution environment than all other software in the system, a host partition that executes a host OS and host virtualization stack, and one or more guest partitions corresponding to VM guests.

VM host nodes are frequently arranged into clusters of related VM host nodes, such as failover clusters. In these cluster environments, a given VM can generally be hosted at any VM host node in the cluster, and can be migrated among VM host nodes in the cluster (e.g., due to a VM host node failure, due to VM host node maintenance or upgrades, due to load balancing). VM migration can be stateful, which can take a variety of forms. One form is VM live migration, in which a virtualization stack transfers VM state (e.g., CPU register state, memory state) from a source VM host node to a target VM host node, and transfers execution of the VM to the target VM host node in a transparent manner (e.g., such that a VM guest OS and workload continues executing substantially uninterrupted). Another form is VM save/restore migration, in which a virtualization stack saves VM state at a source VM host node, restores the VM state at a target VM host node, and brings up the VM at the target node. Another form is hibernation-based VM migration, in which a guest OS at a VM on a source VM host node enters a hibernation state, the hibernation state is transferred to a VM target node, and the guest OS is resumed from hibernation at the target node. Alternatively, VM migration can be non-stateful, in which a VM is "powered down" on a source VM host node, and then restarted on a target VM host node.

Due to its particular hardware and/or software configuration, a VM host node has a set of available features. These can include a hardware feature set, such as a set of available central processing unit (CPU) extensions (processor instruction set architecture extensions), and a software feature set such as a set of externally visible hypervisor features (e.g., hypervisor features that are exposed to a guest OS). As examples, a set of available CPU extensions available at a given VM host node can vary based on the CPU model/generation installed at the VM host node, and can include various multimedia extensions such as Advanced Vector Extensions (AVX) or AVX512, various security extensions such as Software Guard Extensions (SGX) and Multi-Key Total Memory Encryption (MKTME), and the like. As examples, a set of externally visible hypervisor features available at a given VM host node can vary based on a version of a hypervisor installed at the VM host node, and can include, as examples, virtualized interrupt controllers (e.g., a virtualized Programmable Interrupt Controller (PIC), a virtualized Advanced Programmable Interrupt Controller (APIC), a virtualized input/output (I/O) Advanced Programmable Interrupt Controller (I/O-APIC)), timers, messaging mechanisms, memory management enlightenments, and the like.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method, implemented at a computer system that includes a processor, for VM creation based on a dynamically-calculated group feature set, the method including: identifying a plurality of feature sets, wherein each feature set in the plurality of feature sets: corresponds to a different VM host node of a plurality of VM host nodes that are part of a common VM migration group, and indicates a set of features available at a corresponding VM host node; calculating, from the plurality of feature sets, a group feature set including a subset of features that are common among the plurality of feature sets; and configuring a VM created within the plurality of VM host nodes to use the group feature set.

In some aspects, the techniques described herein relate to a computer system, including: a processing system; and a computer storage media that stores computer-executable instructions that are executable by the processing system to cause the computer system to at least: identify a plurality of feature sets, wherein each feature set in the plurality of feature sets: corresponds to a different VM host node of a plurality of VM host nodes that are part of a common VM migration group, and indicates a set of features available at a corresponding VM host node; calculate, from the plurality of feature sets, a group feature set including a subset of features that are common among the plurality of feature sets; and configure a VM created within the plurality of VM host nodes to use the group feature set.

In some aspects, the techniques described herein relate to a computer program product including a computer storage media that stores computer-executable instructions that are executable by a processing system to cause a computer system to at least: identify a plurality of feature sets, wherein each feature set in the plurality of feature sets: corresponds to a different VM host node of a plurality of VM host nodes that are part of a common VM migration group, and indicates a set of features available at a corresponding VM host node; calculate, from the plurality of feature sets, a group feature set including a subset of features that are common among the plurality of feature sets; and configure a VM created within the plurality of VM host nodes to use the group feature set.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

Figure 1:
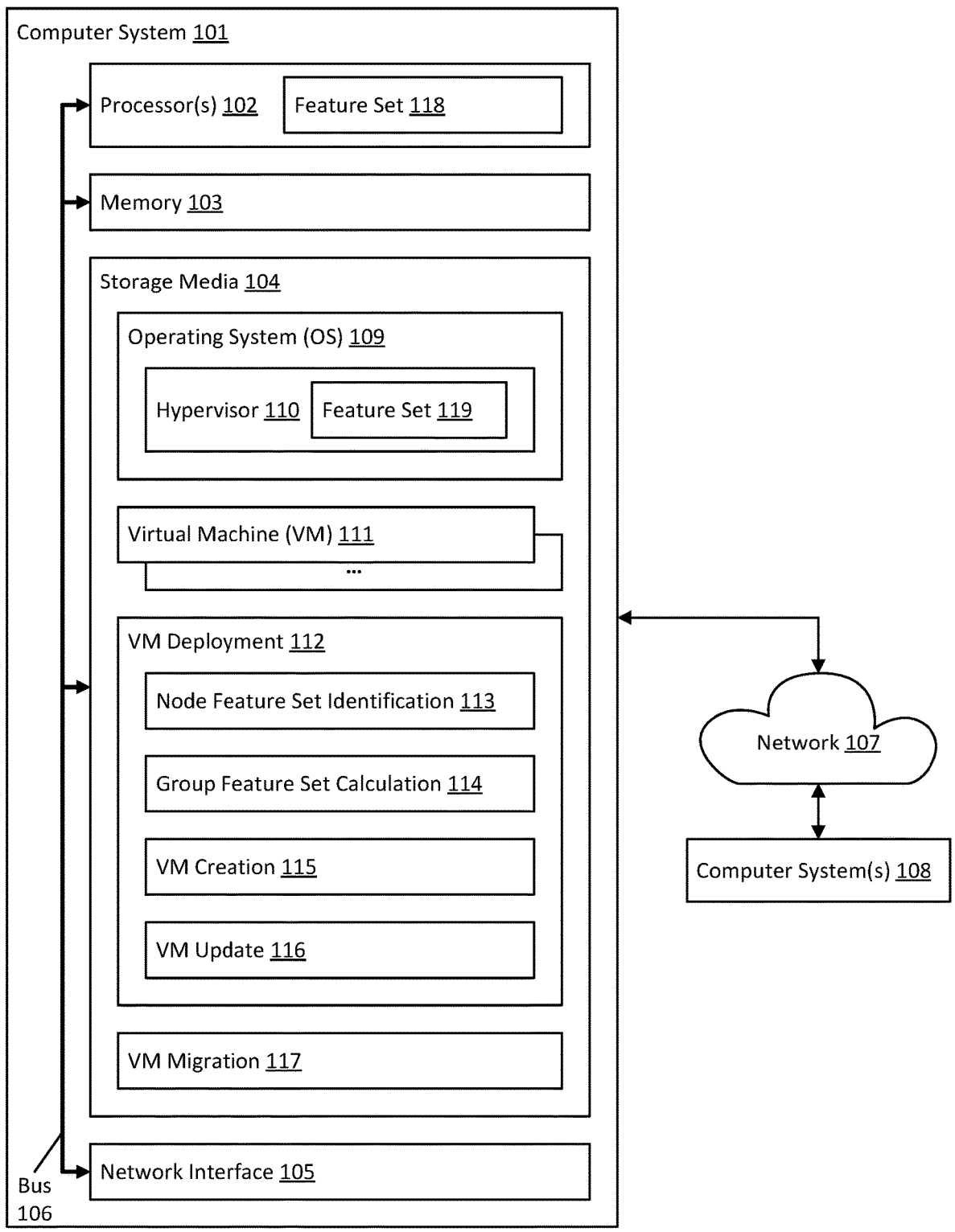
FIG. 1 illustrates an example computer architecture that facilitates VM creation based on a dynamic calculation of a group VM host node feature set.

Virtual machine (VM) migration challenges can arise when hosting VMs within clusters that comprise VM host nodes having varying feature sets. When hosting a VM, a hypervisor may present an entirety of a set of available VM host node features to the VM. For example, to present an entirety of a set of available features to a VM, the hypervisor may present the VM with a CPU identifier (CPUID) corresponding to an actual CPU installed at the VM host node, and with a full set externally-visible features provided by the hypervisor installed at the VM host node. However, this could limit the ability to perform stateful migration of VMs across VM host nodes in a cluster comprising VM host nodes having varying feature sets. For example, if a VM is started on a source VM host node having a newer generation of CPU (e.g., capable of AVX512 CPU instructions) and is presented these features by a hypervisor, that VM may fail if it is statefully migrated to a target VM host node having an older generation of CPU (e.g., capable of AVX CPU instructions, but not AVX512 CPU instructions). For instance, because the VM's guest OS was started with exposure to a CPU capable of AVX512 CPU instructions, the VM will expect to have AVX512 CPU instructions available to it, even when it is statefully migrated to the target VM host node. As those instructions are not available at the target VM host node, if the VM attempts to execute one of these instructions at the target VM host node, that attempt will cause a fatal failure (e.g., an invalid instruction exception).

In an attempt to address these challenges, some VM hosting solutions have introduced static compatibility modes for VMs. Static compatibility modes rely on the fact that a hypervisor may present only a subset of the set of available features to a VM. For example, to present a subset of available features to a VM, the hypervisor may present the VM with a CPUID corresponding to a different model CPU than the one installed at the VM host node (e.g., an older generation of CPU than the actual CPU installed at the VM host node, and which lacks one or more extensions available at the actual CPU installed at the VM host node), and/or present the VM with only a subset of externally-visible hypervisor features provided by the hypervisor installed at the VM host node. Implementation of static compatibility modes involves a human manually selecting a largest common subset of features that is universally supported by VM host nodes, and using that largest common subset of features as the features that a hypervisor exposes to VMs.

While static compatibility modes do facilitate stateful VM migrations, they have several drawbacks. One drawback is that the feature sets used by static compatibility modes are manually selected by humans, making them labor-intensive to develop and maintain, and prone to error in configuration. This means that they are infrequently updated and can significantly trail hardware and software developments. Another drawback is that, given the broad array of hardware and software environments available, static compatibility modes include a fairly limited set of features; for example, they are limited to CPU and hypervisor features that have been available for many years (or even decades), and completely lack more advanced CPU features (e.g., AVX, AVX512, SGX, MKTME) and externally-visible hypervisor features (e.g., virtualized interrupt controllers, timers, messaging mechanisms, memory management enlightenments) that have only recently been introduced. As a result, VMs cannot utilize these more advanced features, which can significantly impact VM performance and increase power consumption. Yet another drawback is that hardware resources (e.g., corresponding to these advanced CPU features) and software features at VM host nodes go unutilized or underutilized, leading to waste of valuable computing resources.

One way to avoid use of static compatibility modes is to pin a VM to one or more VM host nodes. For example if there is a set of one or more "advanced" VM host nodes in a cluster (e.g., VM host node(s) having a larger hardware and/or software feature set than other VM host nodes in the cluster), then an advanced VM (e.g., that uses an expanded feature set) can be pinned to that set of advanced VM host node(s), such that the VM can migrate only among the "advanced" VM host nodes within that set. However, this has disadvantages, such as poor load balancing and an increased likelihood of downtime.

The embodiments described herein are directed to a dynamic compatibility mode that considers the feature sets available on the actual VM host nodes on which a given VM could be hosted (e.g., a set of VM host nodes in a target cluster, among which the VM may migrate). Embodiments dynamically calculate a "group feature set" based on the various individual feature sets the actual VM host nodes on which a given VM could be hosted, and uses this group feature set when starting the VM. In embodiments, the group feature set includes at least a subset of features present in all of the VM host nodes. Due to the dynamic calculation, this group feature set changes over time as VM host nodes in the cluster are added, removed, upgraded (e.g., installing host OS software updates, upgrading a hypervisor, replacing hardware), downgraded (e.g., reverting host OS software updates, reverting a hypervisor upgrade, and replacing hardware), and/or replaced. Notably, the dynamic compatibility mode described herein addresses each drawback outlined above for static compatibility modes. By using dynamic calculations, the dynamic compatibility mode eliminates the need for human involvement in feature set selection, and leads to the use of feature sets that are representative of the VM host nodes actually being used for hosting a given VM. This enables VMs to utilize modern CPU and hypervisor features in cluster environments (increasing VM performance and decreasing power consumption), and reduces the waste of valuable computing resources.

FIG. 1 illustrates an example computer architecture 100 that facilitates VM creation based on a dynamic calculation of a group VM host node feature set. As shown, computer architecture 100 includes a computer system 101 comprising processor(s) 102 (e.g., a single processor, or a plurality of processors), memory 103 (e.g., system or main memory), storage media 104 (e.g., a single computer-readable storage medium, or a plurality of computer-readable storage media), or a network interface 105 (e.g., one or more network interface cards), all interconnected by a bus 106. As shown, using network interface 105, computer system 101 interconnects via a network 107 to computer system(s) 108 (e.g., a single computer system, or a plurality of computer systems).

In embodiments, computer system 101 manages deployment of VMs within a group of VM host nodes (e.g., a cluster of VM host nodes comprising a common VM migration group), including facilitating VM creation on a VM host node based on a dynamic calculation of a group VM host node feature set. Thus, the storage media 104 is illustrated as storing computer-executable instructions corresponding to a VM deployment component 112.

In some embodiments, in addition to managing deployment of VMs, computer system 101 is, itself, also a VM host node; thus, the storage media 104 is illustrated as, in at least some embodiments, storing computer-executable instructions corresponding to an OS 109 (e.g., a host OS) that includes a hypervisor 110 that partitions resources of computer system 101 into different host partitions for executing one or more VM images (e.g., VM 111). Additionally, or alternatively, in addition to managing VM deployment, in some embodiments, computer system 101 also manages VM migration; thus, thus the storage media 104 is illustrated as, in at least some embodiments, storing computer-executable instructions corresponding to a VM migration component 117.

Figure 2:
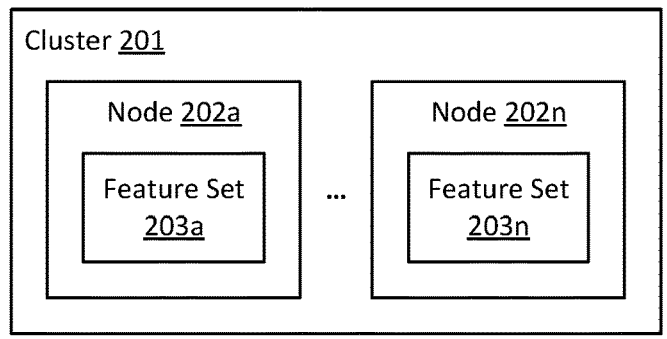
FIG. 2 illustrates an example of a cluster comprising a plurality of VM host nodes.

To illustrate one embodiment in which computer system 101 may operate, FIG. 2 illustrates an example 200 of a cluster 201 comprising a plurality of VM host nodes (e.g., node 202a to node 202n, collectively referred to as "VM host nodes 202"). In embodiments, cluster 201 is failover cluster capable of statefully migrating VMs among the VM host nodes 202. In the context of example 200, computer system 101 may represent one or more of the VM host nodes 202, with computer system(s) 108 being others of VM host nodes 202, such that computer system 101 is a VM host node that also manages deployment of VMs to one or more of VM host nodes 202 (e.g., to itself). In these embodiments, computer system 101 includes the VM deployment component 112 as well as the hypervisor 110. Additionally, in some embodiments, computer system 101 also manages VM migration among at least a subset of VM host nodes 202 (e.g., from itself to another VM host node); in these embodiments, computer system 101 also includes the VM migration component 117.

Figure 3:
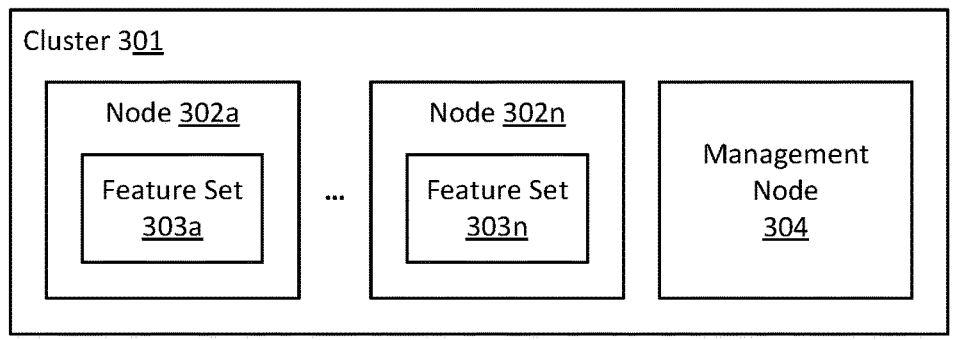
FIG. 3 illustrates an example of a cluster comprising a plurality of VM host nodes as well as a management node.

To illustrate another embodiment in which computer system 101 may operate, FIG. 3 illustrates an example 300 of a cluster 301 comprising a plurality of VM host nodes (e.g., node 302a to node 302n, collectively referred to as "VM host nodes 302") as well as a management node 304. In embodiments, cluster 301 is failover cluster capable of statefully migrating VMs among the VM host nodes 302. In the context of example 300, computer system 101 may represent management node 304, with computer system(s) 108 being VM host nodes 302, such that computer system 101 manages deployment of VMs to VM host nodes 303 without actually serving as a VM host node itself. In these embodiments, computer system 101 includes the VM deployment component 112, but may lack the hypervisor 110. Additionally, in some embodiments, computer system 101 also manages VM migration among VM host nodes 303; in these embodiments, computer system 101 also includes the VM migration component 117.

Figure 4:
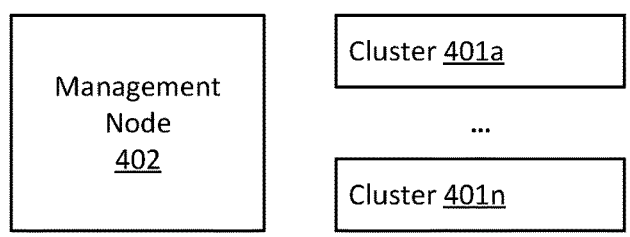
FIG. 4 illustrates an example of a management node that manages deployment of VMs to VM host nodes within a plurality of clusters.

To illustrate yet another embodiment in which computer system 101 may operate, FIG. 4 illustrates an example 400 of a management node 402 that manages deployment of VMs to VM host nodes within a plurality of clusters (e.g., cluster 401a to cluster 401n, collectively referred to as "clusters 401"). In embodiments, each cluster of clusters 401 is a failover cluster capable of statefully migrating VMs among the VM host nodes within the cluster. In the context of example 400, computer system 101 may represent management node 402, with computer system(s) 108 being VM host nodes within clusters 401, such that computer system 101 manages deployment of VMs to VM host nodes within clusters 401 without actually serving as a VM host node itself. In these embodiments, computer system 101 includes the VM deployment component 112, but may lack the hypervisor 110. Additionally, in some embodiments, computer system 101 also manages VM migration among VM host nodes within a given cluster, or even among clusters; in these embodiments, computer system 101 also includes the VM migration component 117.

FIG. 1 illustrates internal components of the VM deployment component 112. Each internal component of the VM deployment component 112 depicted in FIG. 1 represents various functionalities that the VM deployment component 112 might implement in accordance with various embodiments described herein. It will be appreciated, however, that the depicted components—including their identity and arrangement—are presented merely as an aid in describing example embodiments of the VM deployment component 112.

The VM deployment component 112 enables a dynamic compatibility mode that considers the feature sets available on the actual VM host nodes on which a given VM could be hosted, through calculation of a "group feature set" based on the various individual feature sets the actual VM host nodes on which a given VM could be hosted. To enable this functionality, the VM deployment component 112 is illustrated as including a node feature set identification component 113 and a group feature set calculation component 114.

In embodiments, the node feature set identification component 113 identifies a feature set for every VM host node in a given cluster of VM host nodes. Referring to FIG. 2, within cluster 201, the node feature set identification component 113 identifies a feature set 203a for node 202a and a feature set 203n for node 202n. Referring to FIG. 3, within cluster 301, the node feature set identification component 113 identifies a feature set 303a for node 302a and a feature set 303n for node 302n. In embodiments, the feature set for a given VM host node includes hardware (e.g., CPU) features. Thus, for example, processor 102 of computer system 101 is illustrated as including feature set 118. Examples of hardware features include CPU extensions, such as AVX, AVX512, SGX, MKTME, etc. Additionally, or alternatively, in embodiments, the feature set for a given VM host node includes software (e.g., hypervisor) features. Thus, for example, hypervisor 110 at computer system 101 is illustrated as including feature set 119. Examples of software features include externally-visible hypervisor features, such as a virtualized interrupt controller, a timer, a messaging mechanism, a memory management enlightenment, and the like.

The manner in which the node feature set identification component 113 identifies a feature set for a given VM host node can vary based on environment. Referring to FIG. 2, for example, each of VM host nodes 202 may include the VM deployment component 112. In these embodiments, the VM host nodes 202 operate in a peer-to-peer manner, such that each VM host node of VM host nodes 202 identifies a feature set for itself, and writes that feature set to a shared database. In these embodiments, each node of VM host nodes 202 has a shared view of VM host node feature sets via this shared database. In another example, referring to FIGS. 3 and 4, a management node 304, 402 may maintain a database of VM host node feature sets, and obtain those feature sets from a cluster of VM host nodes by querying each VM host node, or by receiving a push of information from each VM host node. In one embodiment, the shared database is a shared registry hive, which is a logical group of keys, subkeys, and values in a registry, which is shared among VM host nodes (e.g., WINDOWS shared registry hive). In this embodiment, each VM host node stores a node-specific feature set in the shared registry hive, and as these node-specific feature sets are recomputed/updated by their respective nodes, those updated values are propagated to every VM host node's registry.

In embodiments, the group feature set calculation component 114 uses the individual node-based feature sets identified by the node feature set identification component 113 for a group of VM host nodes (e.g., cluster 201, cluster 301), to calculate a group feature set for the group of VM host nodes. In embodiments, a group feature set includes a set of features that are common among the node-based feature sets. In embodiments, this is the largest common set of features among the node-based feature sets.

The manner in which the group feature set calculation component 114 identifies a group feature set for a group of VM host nodes can vary based on environment. Referring to FIG. 2, for example, each of VM host nodes 202 may include the VM deployment component 112, and the VM host nodes 202 operate in a peer-to-peer manner. In these embodiments, a given VM host node of VM host nodes 202 calculates a group feature set using individual node feature sets written to a shared database (e.g., in connection with creation of a new VM at the VM host node). In another example, referring to FIGS. 3 and 4, a management node 304, 402 calculates a group feature set for a cluster (e.g., in connection with assigning a new VM to a VM host node in the cluster) based on a database of node feature sets that is maintained by the management node.

In embodiments, the node feature set identification component 113 dynamically updates the feature set for one or more VM host nodes, and/or the group feature set calculation component 114 dynamically recalculates a new group feature set for a group of VM host nodes. In embodiments, these dynamic node feature set updates (node feature set identification component 113) and group feature set recalculations (group feature set calculation component 114) are performed based on triggering events, such as the addition of a VM host node to a cluster, the removal of a VM host node from the cluster, the rebooting of a VM host node within the cluster, a VM host node state change (e.g., a hardware or software change), the creation of a VM within the cluster, and the like.

In some embodiments, the group feature set calculation component 114 may determine that a feature that was previously present in a group feature set is no longer present after a group feature set re-calculation (e.g., due to the addition of a VM host node having an older CPU generation than existing nodes in a cluster, due to a software downgrade). The behavior when the group feature set calculation component 114 determines that a group feature set has been reduced can vary depending on implementation and design goals. Some embodiments generate a warning, such as a warning included in a cluster validation report, an alert (e.g., targeted at a cluster administrator), and the like. In some embodiments, this warning includes an indication that a particular VM that is already running may not operate properly if it is statefully migrated to the VM host node whose individual feature set caused the reduced group feature set, or if the particular VM is statefully migrated to any VM host node that has a reduced feature set as compared to the particular VM. In other embodiments, this warning includes an indication that a VM's features could be reduced (e.g., if the VM is migrated to the VM host node that caused the group feature set to be reduced, if the VM is migrated to some other VM host node having a reduced feature set as compared to the VM, or if the VM goes through a state transition). Some embodiments may prevent a stateful migration of an already running VM to a VM host node whose individual feature set caused the reduced group feature set, or to some other VM host node having a reduced feature set as compared to the VM.

The VM deployment component 112 is also illustrated as including a VM creation component 115 and a VM update component 116. In embodiments, the VM creation component 115 initiates creation of a VM at a particular VM host node while configuring that VM to use a group feature set determined by the group feature set calculation component 114. In embodiments, via a configuration setting, the VM creation component 115 enables a VM owner to opt-in to use of a dynamic compatibility mode (e.g., a dynamically-calculated group feature set). In embodiments, when a VM is not opted into use of a dynamic compatibility mode, the VM creation component 115 configures the VM to use a dynamic compatibility mode, to use the full individual feature set of a target VM host node, or to use some other custom feature set.

In embodiments, based on a re-calculation of a group feature set by the group feature set calculation component 114, the VM update component 116 updates an existing VM to use a new group feature set. In some embodiments, that existing VM actually utilizes that new group feature set upon VM reset (e.g., a host-initiated guest OS reboot).

The components of the VM deployment component 112 are now described in connection with FIG. 5, which illustrates a flow chart of an example method 500 for VM creation based on a dynamically-calculated group feature set. In embodiments, instructions for implementing method 500 are encoded as computer-executable instructions (e.g., VM deployment component 112) stored on a computer storage media (e.g., storage media 104) that are executable by a processor (e.g., processor 102) to cause a computer system (e.g., computer system 101) to perform method 500.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 5:
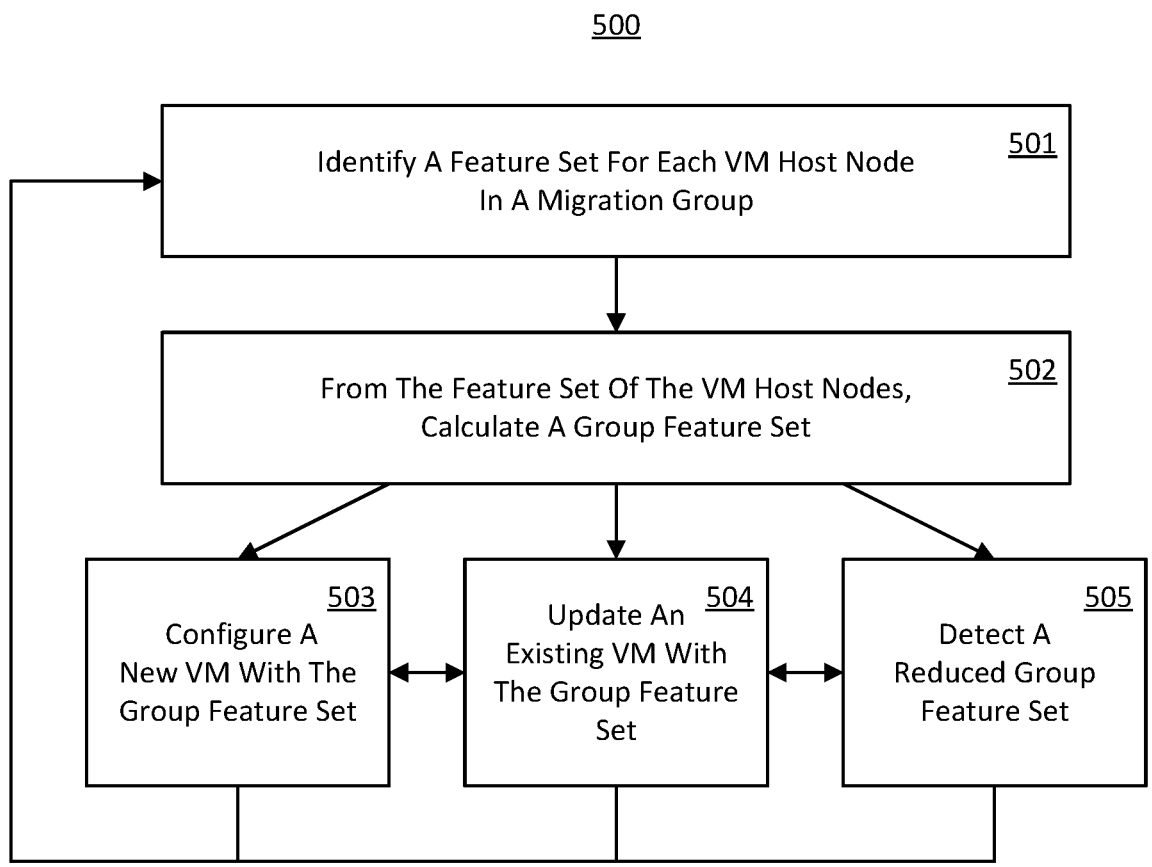
FIG. 5 illustrates a flow chart of an example method for VM creation based on a dynamically-calculated group feature set.

Referring to FIG. 5, in embodiments, method 500 comprises an act 501 of identifying a feature set for each VM host node in a migration group. In some embodiments, act 501 comprises identifying a plurality of feature sets. In embodiments, each feature set in the plurality of feature sets (1) corresponds to a different VM host node of a plurality of VM host nodes that are part of a common VM migration group, and (2) indicates a set of features available at a corresponding VM host node. In a first example, within cluster 201 (a common VM migration group), the node feature set identification component 113, executing at each of VM host nodes 202, identifies feature set 203a for node 202a to feature set 203n for node 202n (e.g., in a peer-to-peer manner, in which each VM hosting node identifies its own feature set, and stores that feature set in a shared database). In a second example, within cluster 301 (a common VM migration group), the node feature set identification component 113, executing at management node 304, identifies feature set 303a for node 302a to feature set 303n for node 302n. In a third example, for each of clusters 401 (each a common VM migration group), the node feature set identification component 113, executing at management node 402, identifies feature sets for each VM hosting node in the cluster. An effect of act 501 is to identify in individualized feature set for each actual VM hosting node at which a VM being managed by the VM deployment component 112 may be hosted.

Method 500 also comprises an act 502 of calculating a group feature set from the feature set of the VM host nodes. In some embodiments, act 502 comprises calculating, from the plurality of feature sets, a group feature set (i.e., a dynamically-calculated group feature set) comprising a subset of features that are common among the plurality of feature sets. Continuing the first example of act 501, the group feature set calculation component 114, executing at one of VM host nodes 202 (e.g., a node at which a VM creation is requested), calculates a subset of features from feature set 203a to feature set 203n that are common among the feature sets identified in act 501 (e.g., based on a shared database). Continuing the second example of act 501, the group feature set calculation component 114, executing at management node 304, calculates a subset of features from feature set 303a to feature set 303n that are common among the feature sets identified in act 501. Continuing the third example of act 501, the group feature set calculation component 114, executing at management node 402, calculates a subset of features from the feature sets identified in act 501 for each of clusters 401. An effect of act 502 is to identify, for a particular group of VM hosting nodes, a customized group of features that are common across these particular VM hosting nodes. Notably, this is in contrast to a manual and statically-determined feature set used by conventional static compatibility modes.

As discussed, an individual feature set can comprise processor features—such as CPU extensions (e.g., processor instruction set architecture extensions), and/or an individual feature set can comprise software features—such as externally-visible hypervisor features. Thus, a group feature set is also comprised of processor and/or software features. In some embodiments of act 502, the group feature set comprises at least one of a processor feature or a hypervisor feature. In some embodiments, the group feature set comprises the processor feature, and the processor feature is at least one of AVX, AVX512, SGX, or MKTME. Additionally, or alternatively, in some embodiments, the group feature set comprises the hypervisor feature, and the hypervisor feature is a virtualized interrupt controller, a timer, a messaging mechanism, a memory management enlightenment, or the like.

After act 502, method 500 also comprises one or more of an act 503 of configuring a new VM with the group feature set, an act 504 of updating an existing VM with the group feature set, or an act 505 of detecting a reduced group feature set. As indicated by horizontal arrows between these acts, method 500 can include any combination of act 503 to act 505. When more than one of these acts is present, those acts can be performed serially (in any order), or in parallel.

In some embodiments, act 503 comprises configuring a VM created within the plurality of VM host nodes to use the group feature set (based on creation of the VM within the plurality of VM host nodes). Continuing the first example of acts 501 and 502, when creating a new VM at a particular VM host node of VM host nodes 202, the VM creation component 115 executing at the particular VM host node uses a group feature set (as calculated by the group feature set calculation component 114 in act 502) as a set of features to expose to the new VM. Continuing the second example of acts 501 and 502, when creating a VM on one of VM host nodes 302, the VM creation component 115, executing at management node 304, uses a group feature set (as calculated by the group feature set calculation component 114 in act 502) as a set of features to expose to the new VM. Continuing the third example of acts 501 and 502, when creating a VM within one of clusters 401, the VM creation component 115, executing at management node 402, uses an appropriate group feature set for the cluster (as calculated by the group feature set calculation component 114 in act 502) as a set of features to expose to the new VM. An effect of act 503 is to use a dynamically-calculated group feature set for a new VM that reflects a set of common features among a group of VMs on which the new VM may operate.

In some embodiments, act 503 is only performed for a VM that is configured to use a dynamic compatibility mode. Thus, in some embodiments, configuring the VM to use the group feature set is based on the VM being opted-in to use of dynamic feature sets.

In some embodiments, act 504 comprises configuring an existing VM to use the group feature set, such as by pushing the group feature set to an existing VM. Continuing the first example of acts 501 and 502, the VM creation component 115 executing at one of VM host nodes 202 pushes a group feature set (as calculated by the group feature set calculation component 114 in act 502) to an existing VM within cluster 201. Continuing the second example of acts 501 and 502, the VM creation component 115, executing at management node 304, pushes a group feature set (as calculated by the group feature set calculation component 114 in act 502) to an existing VM within cluster 301. Continuing the third example of acts 501 and 502, the VM creation component 115, executing at management node 402, pushes a group feature set (as calculated by the group feature set calculation component 114 in act 502) to an existing VM within one of clusters 401. An effect of act 504 is to provide an existing VM with knowledge of availability of a new group feature set. In embodiments, this VM utilizes that new group feature set upon VM reset (e.g., a host-initiated guest OS reboot).

In some embodiments, act 505 comprises determining that the group feature set lacks a feature present in a prior group feature set. In an example, a new group feature set may lack a feature that was available in a prior group feature set due to addition of older-generation hardware, due to a software downgrade, etc. The behavior when the group feature set calculation component 114 determines that a group feature set has been reduced can vary. For example, behaviors can include generating a warning/alert, preventing stateful VM migration to a VM host node that caused the group feature set to be reduced, reducing a VM's features (e.g., when it is migrated to the VM host node that caused the group feature set to be reduced, or when the VM goes through a state transition), etc. Thus, for example, in embodiments, act 505 may include generating a warning, reconfiguring a VM to use the reduced group feature set upon reboot, and the like.

As will be appreciated in view of the foregoing disclosure, and particularly in view the first example discussed in connection with method 500, in embodiments, method 500 can be performed at a computer system that is also a VM host node. Thus, in some embodiments, the method is performed at a VM host node on which the VM is created. As will also be appreciated in view of the foregoing disclosure, and particularly in view of the second and third examples discussed in connection with method 500, in embodiments, method 500 can be performed at a management computer system not a VM host node. Thus, in other embodiments, the method is performed at a system other than a VM host node on which the VM is created.

As indicated by arrows proceeding from each of act 503, act 504, and act 505, and into act 501, method 500 can repeat regardless of which act(s) of act 503 to act 505 are performed. In embodiments, these arrows indicate a dynamic recalculation of the group feature set. Thus, in some embodiments, the group feature set is a first group feature set, and method 500 further comprises calculating a second group feature set. In embodiments, the second group feature set could be different than the first group feature set, or could be the same as the first group feature set. In embodiments, this second group feature set is symmetrically pushed to all nodes in a cluster, such as through used of a shared registry hive.

A group feature set calculation/recompute can be performed periodically, or it can be triggered by some event—such as the addition of a VM host node to a cluster, the removal of a VM host node from the cluster, the rebooting of a VM host node within the cluster, a VM host node state change (e.g., a hardware or software change), the creation of a VM within the cluster, and the like. Thus, in some embodiments of method 500, the recalculation is based on detecting a change within the plurality of VM host nodes, and the change is at least one of a VM host node addition, a VM host node removal, a VM host node upgrade, a VM host node downgrade, a VM host node reboot, or a VM host node reconfiguration.

As will be appreciated, upon a recalculation of a group feature set, any of act 503 to act 505 may be performed. With reference to act 503, in some embodiments the VM is a first VM, and method 500 further comprises, based on creation of a second VM within the plurality of VM host nodes, configuring the second VM to use the second group feature set. With reference to act 504, in some embodiments, method 500 further comprises configuring the VM to use the second group feature set (e.g., by pushing the second group feature set to the VM). With reference to act 505, in some embodiments, method 500 further comprises determining that the second group feature set lacks a feature present in the first group feature set.

Embodiments of the disclosure may comprise or utilize a special-purpose or general-purpose computer system (e.g., computer system 101) that includes computer hardware, such as, for example, a processing system (e.g., processor 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EE-PROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an OS and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for virtual machine (VM) creation based on a dynamically-calculated group feature set, the method comprising:
    identifying a plurality of feature sets, wherein each feature set in the plurality of feature sets:
        corresponds to a different VM host node of a plurality of VM host nodes that are part of a common VM migration group, and identifies a set of features available at a corresponding VM host node;
    calculating, from the plurality of feature sets, a first group feature set comprising a subset of features that are common among the plurality of feature sets;
    configuring a VM created within the plurality of VM host nodes to use the first group feature set; and
    based on detecting a change within the plurality of VM host nodes, calculating a second group feature set.

2. The method of claim 1, wherein the method is performed at a VM host node on which the VM is created.

3. The method of claim 1, wherein the method is performed at a system other than a VM host node on which the VM is created.

4. The method of claim 1, wherein the first group feature set comprises a processor feature.

5. The method of claim 1, wherein the first group feature set comprises a hypervisor feature.

6. The method of claim 1, wherein the change is at least one of:
    a VM host node addition,
    a VM host node removal,
    a VM host node upgrade,
    a VM host node downgrade,
    a VM host node reboot, or
    a VM host node reconfiguration.

7. The method of claim 1, further comprising:
    configuring the VM to use the second group feature set.

8. The method of claim 1, wherein the VM is a first VM, and the method further comprises:
    based on creation of a second VM within the plurality of VM host nodes, configuring the second VM to use the second group feature set.

9. The method of claim 1, further comprising:
    determining that the second group feature set lacks a feature present in the first group feature set; and
    generating a warning.

10. The method of claim 1, further comprising:
    determining that the second group feature set lacks a feature present in the first group feature set; and
    reconfiguring the VM to use the second group feature set upon reboot.

11. The method of claim 1, wherein configuring the VM to use the first group feature set is based on the VM being opted-in to use of dynamic feature sets.

12. A computer system, comprising:
    a processing system; and
    a computer storage media that stores computer-executable instructions that are executable by the processing system to cause the computer system to at least:

calculate, from a plurality of feature sets, a first group feature set comprising a subset of features that are common among the plurality of feature sets, wherein each feature set in the plurality of feature sets:
- corresponds to a different VM host node of a plurality of VM host nodes that are part of a common VM migration group, and
- indicates a set of features available at a corresponding VM host node;

based on creation of a VM within the plurality of VM host nodes, configure the VM to use the first group feature set;

detect a change within the plurality of VM host nodes; and calculate a second group feature set.

13. The computer system of claim 12, wherein the first group feature set comprises a processing system feature.

14. The computer system of claim 12, wherein the first group feature set comprises a hypervisor feature.

15. The computer system of claim 12, wherein the change is at least one of:
- a VM host node addition,
- a VM host node removal,
- a VM host node upgrade,
- a VM host node downgrade,
- a VM host node reboot, or
- a VM host node reconfiguration.

16. The computer system of claim 12, the computer-executable instructions also including instructions that are executable by the processing system to cause the computer system to configure the VM to use the second group feature set.

17. The computer system of claim 12, wherein the VM is a first VM, and wherein the computer-executable instructions also include instructions that are executable by the processing system to cause the computer system to:

based on creation of a second VM within the plurality of VM host nodes, configure the second VM to use the second group feature set.

18. The computer system of claim 12, the computer-executable instructions also including instructions that are executable by the processing system to cause the computer system to:
- determine that the second group feature set lacks a feature present in the first group feature set; and
- generate a warning, or reconfigure the VM to use the second group feature set upon reboot.

19. The computer system of claim 12, wherein configuring the VM to use the first group feature set is based on the VM being opted-in to use of dynamic feature sets.

20. A computer program product comprising a computer storage media that stores computer-executable instructions that are executable by a processing system to cause a computer system to at least:
- identify a plurality of feature sets, wherein each feature set in the plurality of feature sets:
  - corresponds to a different VM host node of a plurality of VM host nodes that are part of a common VM migration group, and
  - indicates a set of features available at a corresponding VM host node;
- calculate, from the plurality of feature sets, a first group feature set comprising a subset of features that are common among the plurality of feature sets;
- based on creation of a first VM within the plurality of VM host nodes, configure the first VM to use the first group feature set;
- detect a change within the plurality of VM host nodes;
- calculate a second group feature set based on the change; and
- based on creation of a second VM within the plurality of VM host nodes, configure the second VM to use the second group feature set.

* * * * *